UNITED STATES PATENT OFFICE.

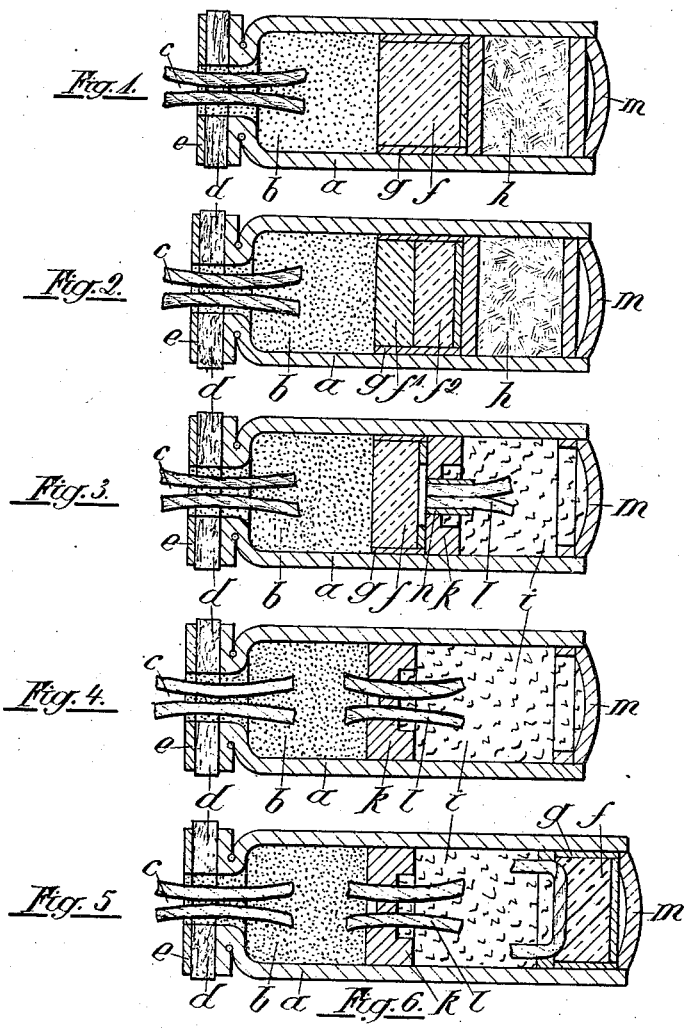

BURKARD BEHR, OF SUHL, GERMANY.

SIGNALING DEVICE.

No. 926,457.

Specification of Letters Patent.

Patented June 29, 1909.

Application filed August 4, 1906. Serial No. 329,208.

*To all whom it may concern:*

Be it known that I, BURKARD BEHR, a citizen of the German Empire, residing at Suhl, in Thuringia, in the Kingdom of Würtemberg, Germany, have invented certain new and useful Improvements in Signaling Devices, of which the following is a description, reference being had to the accompanying drawing, and to the letters and figures of reference marked thereon.

This invention relates to signal rockets for signaling over wide areas, which rockets in consequence of their peculiar composition may be employed both by night and day.

The signal rockets hitherto employed which required only one shot for a single sign of a code, for instance, a letter or a number, necessitated the use of the most varied colors or other means in order to obtain the requisite number of combinations, whereby considerable difficulty was caused in distinguishing between these signs from a distance. The present invention avoids this drawback in a very simple manner by causing the pyrotechnic illuminating substances to appear visible in two ways, either as a steady limited light (hereinafter called a "star") or, in consequence of explosion of the illuminating body, as a kind of flashlight which extends over a large area (hereinafter called "flash"). In combination with two complementary colors, for instance "green" and "red", there is then obtained four elements, so that fourteen combinations for each two elements may be caused to appear successively omitting two combinations. These signals, consisting of at the most only two signs and two different colors, allow a visibility hitherto unattainable even by day being attained.

In the accompanying drawings:—Figure 1 is a section of a rocket with a single star, Fig. 2 a similar view of a rocket with two stars of different colors, Fig. 3 a view of a rocket with a star followed by a flash, Fig. 4 a rocket with a flash, Fig. 5 a rocket with a flash and a subsequent star, Fig. 6 shows in the form of a table, as an example, a combination of the rockets for a figure code.

The rocket consists of a choked pasteboard sheath $a$ which is filled at the bottom with a propelling charge $b$. As the rocket is fired from a gun or pistol, and consequently is mounted in a cartridge case, it is, for the object of better ignition, provided at the bottom with fuses or quick matches $c$ which project beyond the sheath into the powder charge of the cartridge case. The bottom of the rocket also has a thick felt wad $d$ and a cardboard disk $e$ which reduce the first shock of the powder gases on the rocket and also serve as driving wad. The stars $f$ employed are previously pressed into separate wrappers or cases $g$ before being inserted in the rocket case.

Figs. 1, 3 and 5 show single stars $f$. Fig. 2, double stars $f^1 f^2$ burning one after the other. The stars consist of a steadily burning firework substance of suitable composition. The rockets, as shown in Figs. 1 and 2, have above also a charge of iron filings $h$ for obtaining a position of the center of gravity favorable for the shot.

In Fig. 3 a flash $i$ follows the star. These flashes $i$ consist of a very explosive firework powder such as magnesium loosely inserted which receives the desired color by means of suitable salts. The flashes are inclosed as far as possible on all sides, and therefore show no broad open burning surfaces like the stars. A stout cardboard plate $k$ always incloses the flash at the bottom. The igniting connection is made by means of quick matches or fuses $l$, which in Fig. 3 are fixed in a cardboard tube $n$, while in Figs. 4 and 5, where a flash follows directly after the propelling charge, the fuses $l$ are passed directly through the cardboard plate $k$.

In Fig. 5 the star $f$ is immediately ignited and ejected on the tearing of the sheath by the flash, which star immediately after the flash has the appearance of a steadily burning light.

The rockets are closed at the top by means of a cover $m$ and protected from moisture by a coating of paraffin.

The following fourteen signals (in Fig. 6 of the drawings "red" is reproduced by "black" and "green" by "white") are produced by the combination of four elements for instance, the colors "red" and "green" and the "star" and "flash", viz.—

```
A  red   star  and  a  green star  = 1
"  "     "     "    "  red flash   = 2
"  "     "     "    "  green "     = 3
"  "     flash "    "  red star    = 4
"  "     "     "    "  green star  = 5
"  green star  "    "  red star    = 6
"  "     "     "    "  "   flash   = 7
"  "     "     "    "  green "     = 8
"  "     flash "    "  red star    = 9
"  "     "     "    "  green "     = 0
"  red   star  = call
"  "     flash = a code number or group sign
"  green star  = understood
"  "     flash = repeat or counter call.
```

The succession and characterization of the separate signals may of course also be any suitable one. If each signal means a number as hereinbefore indicated, for instance it is possible to signal according to any figure code. It is also possible to signal according to the letter code of the international signal book by interpolating a key, for instance, by making the continuous groups of letters correspond with the continuous groups of figures.

Having now particularly described and ascertained the nature of my said invention and in what manner the same is to be performed, I declare that what I claim is:—

1. A rocket of the kind set forth, comprising a casing, an explosive quick-burning body capable of having different colors imparted to it and of throwing light over a wide area to indicate a flash, said explosive body being located in said casing, and a second body located in said casing in line with the explosive body and capable of burning with a steady light to indicate stars, substantially as described.

2. A rocket of the kind set forth, comprising a casing, an explosive quick burning body capable of having different colors imparted to it and of throwing light over a wide area to indicate a flash, said explosive body being located in said casing, a second body located in said casing in line with the explosive body and capable of burning with a steady light to indicate stars, and means to impart a distinguishing color to said second body, substantially as described.

3. A rocket of the kind set forth, comprising a casing, a propelling charge therein, a charge of highly explosive and quick-burning material capable of having different colors imparted to it and located in said casing in line with said propelling charge, and a charge of relatively slow burning material located in said casing in line with said propelling and explosive charges, said explosive and slow burning charges being capable of different arrangements in said casing to obtain different signals, substantially as described.

In testimony whereof I affix my signature, in presence of two witnesses.

BURKARD BEHR.

Witnesses:
WALTER SCHWAEBSCH,
RUDOLF BRECHT.